United States Patent
Wang

(10) Patent No.: US 11,323,558 B2
(45) Date of Patent: May 3, 2022

(54) METHOD FOR REDUCING TERMINAL TEMPERATURE, DEVICE FOR REDUCING TERMINAL TEMPERATURE, AND STORAGE MEDIUM

(71) Applicant: BEIJING XIAOMI MOBILE SOFTWARE CO., LTD., Beijing (CN)

(72) Inventor: Piguang Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/864,205

(22) Filed: May 1, 2020

(65) Prior Publication Data

US 2021/0136194 A1 May 6, 2021

(30) Foreign Application Priority Data

Oct. 31, 2019 (CN) .......................... 201911054233.9

(51) Int. Cl.
| | |
|---|---|
| H04M 1/72 | (2021.01) |
| H04M 1/72454 | (2021.01) |
| H04M 1/72463 | (2021.01) |
| G06F 11/30 | (2006.01) |
| G08C 17/02 | (2006.01) |

(52) U.S. Cl.
CPC ..... *H04M 1/72454* (2021.01); *G06F 11/3058* (2013.01); *H04M 1/72463* (2021.01); *G08C 17/02* (2013.01); *H04M 2250/12* (2013.01)

(58) Field of Classification Search
CPC combination set(s) only.
See application file for complete search history.

(56) References Cited

U.S. PATENT DOCUMENTS

| | | | |
|---|---|---|---|
| 10,080,173 B1 | 9/2018 | Rai et al. | |
| 2006/0005097 A1* | 1/2006 | Ichikawa | G06F 11/3404 714/745 |
| 2008/0239978 A1* | 10/2008 | Karam | H04W 52/0232 370/252 |
| 2009/0295590 A1* | 12/2009 | Black | H02J 7/007194 340/636.2 |
| 2010/0273517 A1 | 10/2010 | Pinheiro et al. | |

(Continued)

FOREIGN PATENT DOCUMENTS

CN 108684217 A 10/2018

OTHER PUBLICATIONS

Extended European Search Report in Application No. 20176695.3, dated Oct. 23, 2020.

(Continued)

*Primary Examiner* — Junpeng Chen
(74) *Attorney, Agent, or Firm* — Syncoda LLC; Feng Ma

(57) ABSTRACT

A method for reducing terminal temperature includes: connecting to a first network; and monitoring a chip temperature of a terminal, and sending rate reduction information to a network device when the chip temperature is greater than a first predetermined threshold, and the rate reduction information being used to trigger reduction in a transmission rate between the network device and the terminal. As such, the terminal temperature can be reduced by reducing the transmission rate while maintaining the network connection, and user experience can be improved.

14 Claims, 5 Drawing Sheets

(56) References Cited

U.S. PATENT DOCUMENTS

| | | | |
|---|---|---|---|
| 2011/0230163 A1* | 9/2011 | Jin | H04W 24/02 455/404.1 |
| 2013/0007482 A1* | 1/2013 | Rodriguez | G06F 1/3278 713/320 |
| 2014/0157020 A1 | 6/2014 | Hosomi | |
| 2016/0065723 A1* | 3/2016 | Jung | H04M 1/72454 340/586 |
| 2016/0262143 A1* | 9/2016 | Breuer | H04W 72/085 |
| 2020/0036643 A1* | 1/2020 | Jang | G01K 7/425 |
| 2020/0260350 A1* | 8/2020 | Hong | H04W 36/30 |
| 2021/0051592 A1* | 2/2021 | Wang | H04L 5/001 |

OTHER PUBLICATIONS

Technical Disclosure Commons Defensive Publications Series, Throttling downlink throughput to mitigate device temperature increase, Mar. 21, 2019, by Shivank Nayak et al., XP055717820.

* cited by examiner

METHOD FOR REDUCING TERMINAL TEMPERATURE, DEVICE FOR REDUCING TERMINAL TEMPERATURE, AND STORAGE MEDIUM

CROSS-REFERENCE TO RELATED APPLICATION

This application claims priority to Chinese Patent Application 201911054233.9 filed on Oct. 31, 2019, the disclosure of which is hereby incorporated by reference in its entirety.

BACKGROUND

With the development of technology, the current radio communication technology is entering the 5th-Generation (5G) new radio (NR) era. With the advancement of 5G strategy in various countries and the enhancement of 5G network deployment by respective major operators, 5G technology is coming into users' lives faster and faster.

SUMMARY

The present disclosure relates generally to the field of communication technology, and more specifically to a method for reducing terminal temperature, a device for reducing terminal temperature, and a storage medium.

According to an aspect of embodiments of the present disclosure, there is provided a method for reducing terminal temperature, the method including: connecting to a first network; monitoring a chip temperature of a terminal, and sending rate reduction information to a network device when the chip temperature is greater than a first predetermined threshold, the rate reduction information being used to trigger reduction in a transmission rate between the network device and the terminal.

In some embodiments, the rate reduction information includes a first measurement report for reporting to the network device that quality of the first network is lower than a first threshold and quality of a second network is higher than a second threshold.

In some embodiments, monitoring a chip temperature of a terminal, and sending rate reduction information to a network device when the chip temperature is greater than a first predetermined threshold further includes: sending the first measurement report to the network device when a duration in which the chip temperature is greater than the first predetermined threshold exceeds a predetermined first time threshold.

In some embodiments, the method further includes: receiving a first request sent by the network device in response to the first measurement report; and switching to the second network based on the first request, wherein a transmission rate between the terminal and the network device when the terminal is connected to the second network is lower than a transmission rate between the terminal and the network device when the terminal is connected to the first network.

In some embodiments, the method further includes: sending the first measurement report to the network device again when the first request is not received within a predetermined second time threshold.

In some embodiments, after switching to the second network based on the first request, the method further includes: monitoring the chip temperature, sending to the network device, when the chip temperature is less than a second predetermined threshold, a second measurement report for reporting to the network device that quality of the first network is higher than a third threshold and quality of the second network is lower than a fourth threshold; receiving a second request sent by the network device in response to the second measurement report; and switching the connection to the first network based on the second request.

In some embodiments, monitoring the chip temperature, and sending a second measurement report to the network device when the chip temperature is less than a second predetermined threshold further includes: sending the second measurement report to the network device when a duration in which the chip temperature is less than the second predetermined threshold exceeds a predetermined third time threshold.

In some embodiments, the method further includes: sending the second measurement report to the network device again when the second request is not received within a predetermined fourth time threshold.

In some embodiments, the first network is a new radio network, and the second network is a long-term evolution network.

In some embodiments, the rate reduction information includes a rate control signaling, and the rate control signaling is used to trigger the network device to reduce a downlink rate with the terminal.

In some embodiments, the method further includes: monitoring the chip temperature, and sending a rate restoring signaling to the network device when the chip temperature is less than a third predetermined threshold, the rate restoring signaling being used to trigger the network device to restore a downlink rate with the terminal.

According to another aspect of embodiments of the present disclosure, there is provided a device for reducing terminal temperature, including: a connecting component configured to connect to a first network; a monitoring component configured to monitor a chip temperature of a terminal; and a sending component configured to send rate reduction information to a network device when the chip temperature monitored by the monitoring component is greater than a first predetermined threshold, the rate reduction information being used to trigger reduction in a transmission rate between the network device and the terminal.

In some embodiments, the rate reduction information includes a first measurement report for reporting to the network device that quality of the first network is lower than a first threshold and quality of a second network is higher than a second threshold.

In some embodiments, the monitoring component is configured to monitor a chip temperature of the terminal, and the sending component is configured to send rate reduction information to a network device when the chip temperature is greater than a first predetermined threshold by adopting the following manner: sending the first measurement report to the network device when a duration in which the chip temperature is greater than the first predetermined threshold exceeds a predetermined first time threshold.

In some embodiments, the device further includes: a receiving component configured to receive a first request sent by the network device in response to the first measurement report; the connecting component is further configured to switch the connection to the second network based on the first request, wherein a transmission rate between the terminal and the network device when the terminal is connected to the second network is lower than a transmission rate between the terminal and the network device when the terminal is connected to the first network.

In some embodiments, the sending component is further configured to send the first measurement report to the network device again when the first request is not received by the receiving component within a predetermined second time threshold.

In some embodiments, after the connecting component switches the connection to the second network based on the first request, the monitoring component is further configured to monitor the chip temperature, and the sending component is configured to send to the network device, when the chip temperature is less than a second predetermined threshold, a second measurement report for reporting to the network device that quality of the first network is higher than a third threshold and quality of the second network is lower than a fourth threshold; the receiving component is further configured to receive a second request sent by the network device in response to the second measurement report; and the connecting component is further configured to switch the connection to the first network based on the second request.

In some embodiments, the monitoring component is configured to monitor the chip temperature, and the sending component is configured to send a second measurement report to the network device when the chip temperature is less than a second predetermined threshold by adopting the following manner: sending the second measurement report to the network device when a duration in which the chip temperature is less than the second predetermined threshold exceeds a predetermined third time threshold.

In some embodiments, the sending component is further configured to: send the second measurement report to the network device again when the second request is not received by the receiving component within a predetermined fourth time threshold.

In some embodiments, the first network is a new radio network, and the second network is a long-term evolution network.

In some embodiments, the rate reduction information includes a rate control signaling, and the rate control signaling is used to trigger the network device to reduce a downlink rate with the terminal.

In some embodiments, the monitoring component is configured to monitor the chip temperature, and the sending component is configured to send a rate restoring signaling to the network device when the chip temperature is less than a third predetermined threshold, the rate restoring signaling being used to trigger the network device to restore a downlink rate with the terminal.

According to yet another aspect of embodiments of the present disclosure, there is provided a device for reducing terminal temperature, including: a processor; a memory for storing instructions executable by the processor; wherein the processor is configured to execute any of the method for reducing terminal temperature as described above.

According to yet another aspect of embodiments of the present disclosure, there is provided a non-transitory computer-readable storage medium having stored therein instructions that, when executed by a processor of a mobile terminal, enable the mobile terminal to perform any of the method for reducing terminal temperature as described above.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this description, illustrate embodiments consistent with the present disclosure and, together with the description, serve to explain the principles of the present disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

5G technology provides the users with the ultimate speed experience such as high-definition video, virtual reality, and online games etc. by means of the huge advantage of high rate. However, when a terminal is connected to the 5G network for high-speed data transmission, the power consumption of the terminal will increase accordingly, while the temperature of the terminal will also rise. Excessive temperature will affect the lifespan of the hardware and the battery, affect the hardware performance, and even cause injury to the users.

A millimeter wave technology may be adopted by 5G technology to achieve high speed and bring also the problem of heat dissipation of mobile terminals. As for the problem that the terminal temperature is too high as caused by the downlink rate, the method for reducing terminal temperature adopted by the current technology will cause the block error rate (BLER) of the terminal to rise or result in a failure in maintaining network connection, which affects the user experience. The embodiments of the present disclosure provide a method for reducing terminal temperature, which is applied to a terminal.

Figure 1:
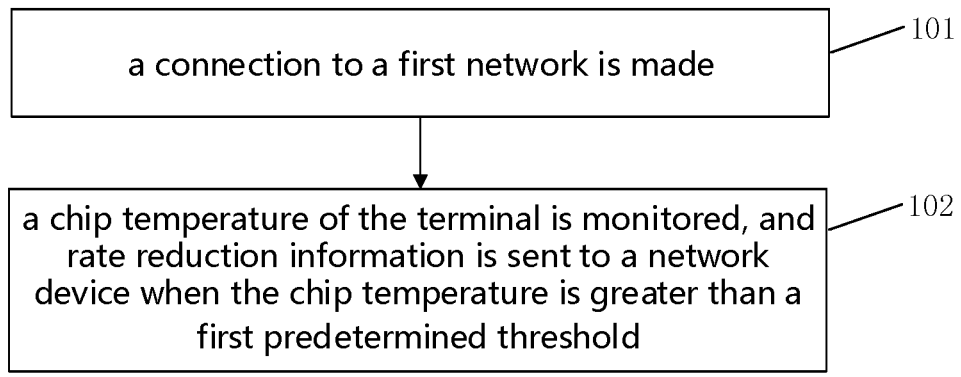
FIG. 1 is a flowchart showing a method for reducing terminal temperature according to some embodiments of the present disclosure.

FIG. 1 shows a method for reducing terminal temperature according to some embodiments of the present disclosure. Referring to FIG. 1, the method can include the following steps.

In step S101, a connection to a first network is made.

The terminal is connected to the first network and accepts services provided by the first network. In some examples, the first network is a 5G network.

In step S102, a chip temperature of the terminal is monitored, and rate reduction information is sent to a network device when the chip temperature is greater than a first predetermined threshold.

The terminal can monitor the temperature of the terminal chip in real time by setting a temperature sensor, and send the rate reduction information to the network when the chip temperature is greater than a first predetermined threshold. Understandably, the rate reduction information can be used to trigger reduction in a transmission rate between the network device and the terminal, and the transmission rate can be an uplink transmission rate or a downlink transmission rate. The transmission rate of the terminal can be reduced by reducing the transmission rate, thereby power consumption of the terminal is reduced, and accordingly, temperature of the terminal is reduced.

According to the embodiments of the present disclosure, by monitoring the chip temperature of the terminal, rate reduction information is sent to the network device when the chip temperature is greater than the first predetermined threshold, thereby the transmission rate between the network device and the terminal is reduced, and accordingly, temperature of the terminal is reduced while network connection is maintained, which improves the user experience.

In some embodiments, the rate reduction information can be a first measurement report, for example, a network system measurement report event B2, which reports to the network device that the quality of the first network is lower than a first threshold and the quality of a second network is higher than a second threshold, that is, it means that service signal of the current first network is poor and service signal of the second network is good. Understandably, the first network and the second network can be networks of different standards, and sending the first measurement report by the terminal is to facilitate the network device to initiate a request for switching network.

Figure 2:
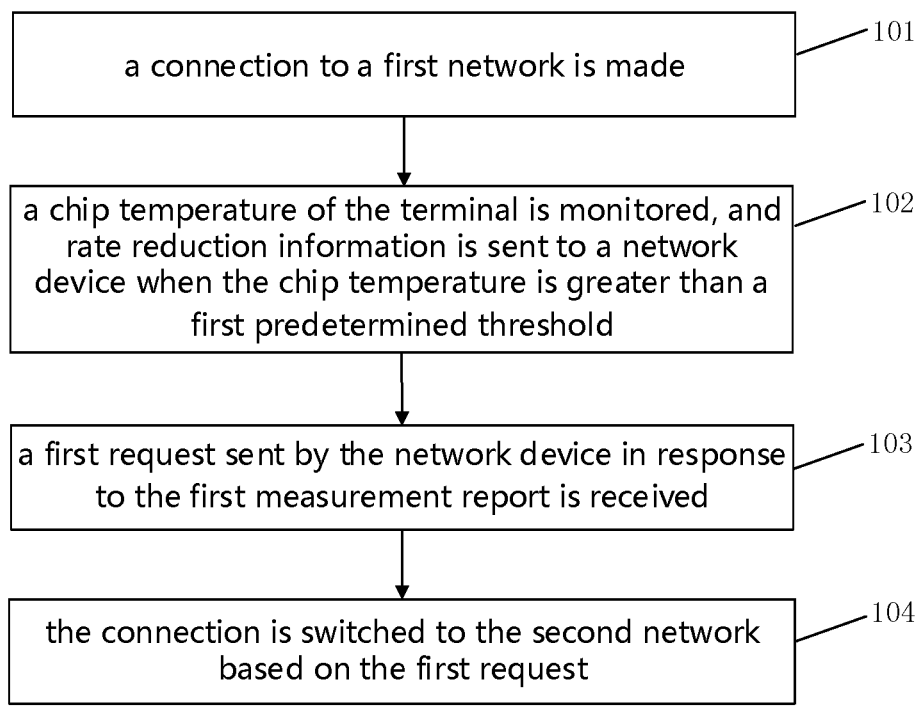
FIG. 2 is a flowchart showing a method for reducing terminal temperature according to some other embodiments of the present disclosure.

FIG. 2 is a flowchart showing a method for reducing terminal temperature according to some other embodiments of the present disclosure. As shown in FIG. 2, in addition to the above steps S101 and S102, the method for reducing terminal temperature further includes the following steps.

In step S103, a first request sent by the network device in response to the first measurement report is received.

The network device receives the first measurement report and sends to the terminal a first request for switching a network, namely, requesting the terminal to switch from the first network to the second network.

In step S104, the connection is switched to the second network based on the first request.

The terminal receives the first request for switching network, sent by the network device, and switches the connection to the second network, a transmission rate between the terminal and the network device when the terminal is connected to the second network is lower than a transmission rate between the terminal and the network device when the terminal is connected to the first network. In some examples, the second network is a long-term evolution (LTE) network.

In some embodiments, the first measurement report is sent to the network device when a duration in which the chip temperature is greater than the first predetermined threshold exceeds a predetermined first time threshold. A first time threshold is predetermined, and the first measurement report is sent to the network device when a duration in which the chip temperature is greater than the first predetermined threshold exceeds the first time threshold, to facilitate the network device to initiate a request for switching network. A higher rate of the terminal can be maintained and unnecessary network switching is avoided.

Understandably, when the first predetermined threshold is relatively high, in order to avoid security risks and poor user experience due to excessive terminal temperature, the first measurement report can be sent immediately to the network device when the chip temperature is detected to be greater than the first predetermined threshold, to facilitate the network device to initiate a request for switching network and perform network switching according to the request.

In some embodiments, the first measurement report is sent to the network device again when the first request is not received within a predetermined second time threshold. A second time threshold is predetermined, the first measurement report is sent to the network device again when the first request is not received from the network device within the second time threshold, that is, the network device is caused to initiate the request for switching network again, which can effectively reduce terminal temperature.

Figure 3:
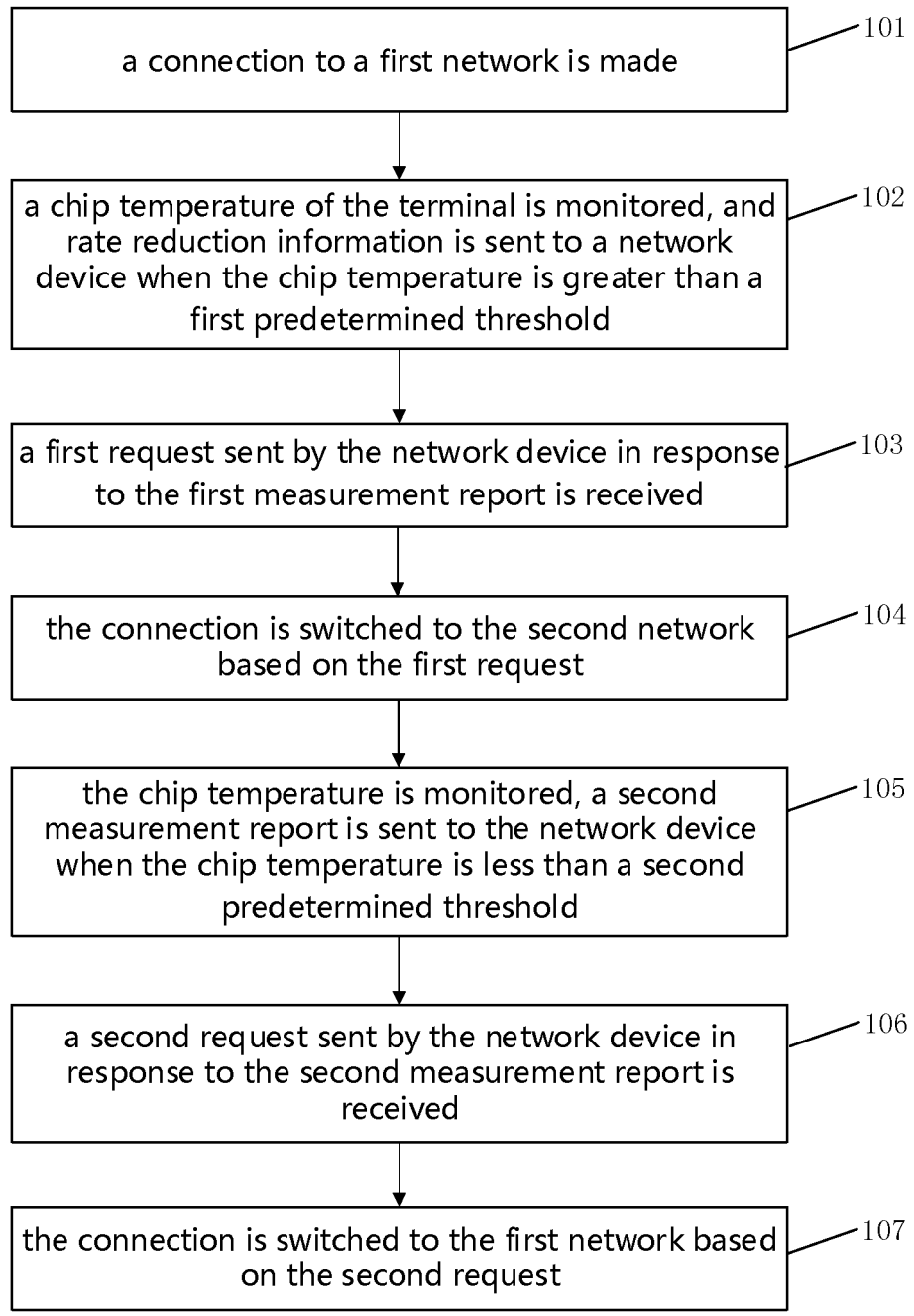
FIG. 3 is a flowchart showing a method for reducing terminal temperature according to yet some other embodiments of the present disclosure.

FIG. 3 is a flowchart showing a method for reducing terminal temperature according to yet some other embodiments of the present disclosure. As shown in FIG. 3, in addition to the above steps S101, S102, S103, and S104, the method for reducing terminal temperature further includes the following steps.

In step S105, the chip temperature is monitored, a second measurement report is sent to the network device when the chip temperature is less than a second predetermined threshold.

The second predetermined threshold can be set to be the same as the first predetermined threshold, or can be set to be different from the first predetermined threshold. For example, the second predetermined threshold can be smaller than the first predetermined threshold, which can more effectively control the terminal temperature, protect electronic components of the terminal from being damaged, and thus extend the lifespan of the terminal. The second measurement report can be, for example, a network system measurement report event B2, which is used to report to the network device that the quality of the first network is higher than a third threshold and the quality of the second network is lower than a fourth threshold, that is, it means that the service signal of the current first network is good, and the service signal of the second network is poor. The sending the second measurement report by the terminal is to facilitate the network device to initiate a request for switching network, namely, switching from the second network to the first network.

In step S106, a second request sent by the network device in response to the second measurement report is received.

The network device receives the second measurement report, and sends to the terminal a second request for switching network, that is, requesting the terminal to switch from the second network to the first network.

In step S107, the connection is switched to the first network based on the second request.

The terminal receives the second request for switching network sent by the network device, and switches the connection to the first network thereby the transmission rate is improved.

In some embodiments, the second measurement report is sent to the network device when a duration in which the chip temperature is less than the second predetermined threshold exceeds a predetermined third time threshold. A third time threshold is predetermined, and a second measurement report is sent to the network device when a duration in which the chip temperature is less than the second predetermined threshold exceeds the third time threshold, that is, when the terminal temperature is kept low and the temperature is stable, to facilitate the network device to initiate a request for switching network. A stable connection between the terminal and network device can be maintained, and frequent network switching can be avoided.

In some embodiments, the second measurement report is sent to the network device again when the second request is not received within a predetermined fourth time threshold. A fourth time threshold is predetermined, the second measurement report is sent to the network device again when the second request is not received within the fourth time threshold, that is, the network device is again caused to initiate a request for switching network, which can make the terminal maintain a high transmission rate.

In some embodiments, the rate reduction information includes a rate control signaling, and the rate control signaling is used to trigger the network device to reduce a downlink rate with the terminal. The chip temperature of the terminal is monitored, a rate control signaling is sent by the terminal to the network when the chip temperature is greater than the first predetermined threshold. The terminal can dynamically control the downlink transmission rate through the rate control signaling, thereby lowering the power consumption of the terminal and thus reducing the terminal temperature.

In some embodiments, the chip temperature is monitored, a rate restoring signaling is sent to the network device when the chip temperature is less than a third predetermined threshold, and the rate restoring signaling is used to trigger the network device to restore a downlink rate with the terminal, which ensures the high transmission rate of the terminal. The third predetermined threshold can be set to be the same as the first predetermined threshold and the second predetermined threshold, or can be set to be different from the first predetermined threshold and the second predetermined threshold, no limitation is made thereto in the embodiment of the present disclosure.

In some embodiments, the first network is a 5G network, and the second network is an LTE network. The first network and the second network can also be networks of other different standards. The first network and the second network can satisfy the following relationship, that is, the transmission rate between the terminal and the network device when the terminal is connected to the second network is lower than the transmission rate between the terminal and the network device when the terminal is connected to the first network.

Figure 4:
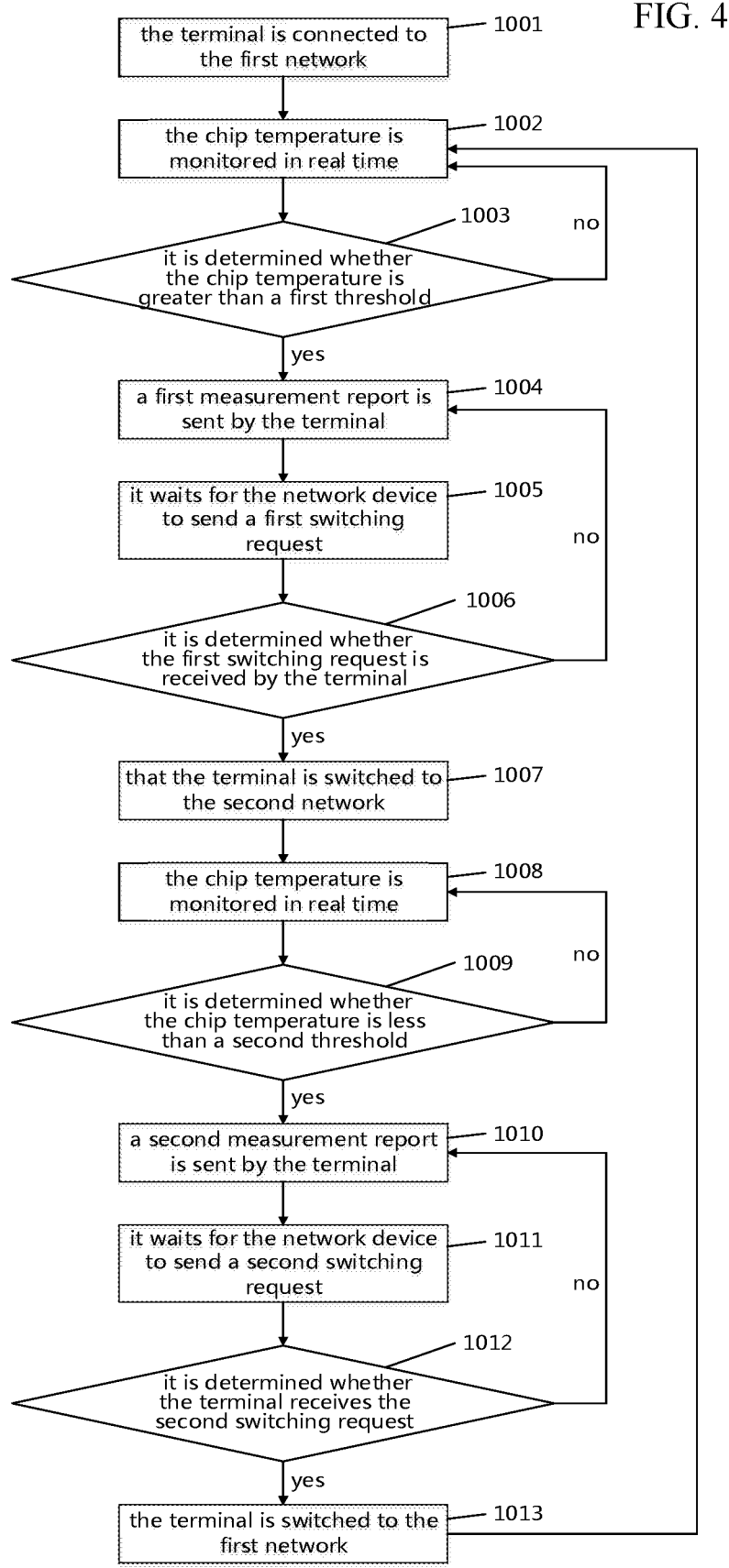
FIG. 4 is a flowchart showing a method for reducing terminal temperature according to yet some other embodiments of the present disclosure.

FIG. 4 is a flowchart showing a method for reducing terminal temperature according to yet some other embodiments of the present disclosure. A specific application mode of the method for reducing terminal temperature is exemplarily described below with reference to FIG. 4.

In step S1001, the terminal is connected to the first network.

In step S1002, the chip temperature is monitored in real time.

In step S1003, it is determined whether the chip temperature is greater than a first threshold.

When the chip temperature is greater than the first threshold, it is executed in step S1004 that a first measurement report is sent by the terminal.

When the chip temperature is not greater than the first threshold, it is executed in step S1002 that the chip temperature is monitored in real time.

In step S1005, it waits for the network device to send a first switching request.

In step S1006, it is determined whether the first switching request is received by the terminal.

When the first switching request is received by the terminal, it is executed in step S1007 that the terminal is switched to the second network.

When the first switching request is not received by the terminal, it is executed in step S1004 that the first measurement report is sent by terminal to the network device again.

In step S1008, the chip temperature is monitored in real time.

In step S1009, it is determined whether the chip temperature is less than a second threshold.

When the chip temperature is less than the second threshold, it is executed in step S1010 that a second measurement report is sent by the terminal.

When the chip temperature is not less than the second threshold, it is executed in step S1008 that the chip temperature is monitored in real time.

In step S1011, it waits for the network device to send a second switching request.

In step S1012, it is determined whether the terminal receives the second switching request.

When the second switching request is received by the terminal, it is executed in step S1013 that the terminal is switched to the first network.

When the second switching request is not received by the terminal, it is executed in step S1010 that the second measurement report is sent by the terminal to the network device again.

Figure 5:
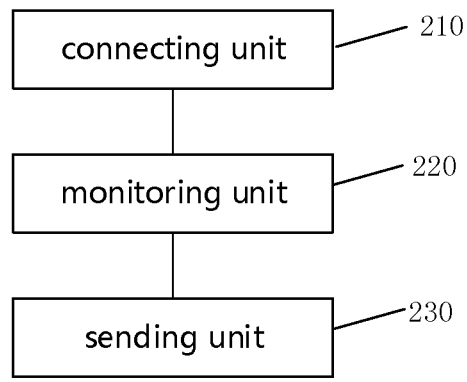
FIG. 5 is a block diagram illustrating a device for reducing terminal temperature according to some embodiments of the present disclosure.

FIG. 5 is a block diagram illustrating a device for reducing terminal temperature according to some embodiments of the present disclosure. Referring to FIG. 5, the device 200 for reducing terminal temperature includes: a connecting component 210, a monitoring component 220, and a sending component 230.

The connecting component 210 is configured to connect to a first network.

The monitoring component 220 is configured to monitor a chip temperature of the terminal.

The sending component 230 is configured to send rate reduction information to a network device when the chip temperature monitored by the monitoring component 220 is greater than a first predetermined threshold, and the rate reduction information is used to trigger reduction in a transmission rate between the network device and the terminal.

In some embodiments, the rate reduction information includes a first measurement report, for reporting to the network device that the quality of the first network is lower than a first threshold and the quality of a second network is higher than a second threshold.

In some embodiments, the monitoring component 220 monitors a chip temperature of the terminal, the sending component 230 sends rate reduction information to a network device when the chip temperature is greater than a first predetermined threshold by adopting the following manner: sending the first measurement report to the network device when a duration in which the chip temperature is greater than the first predetermined threshold exceeds a predetermined first time threshold.

Figure 6:
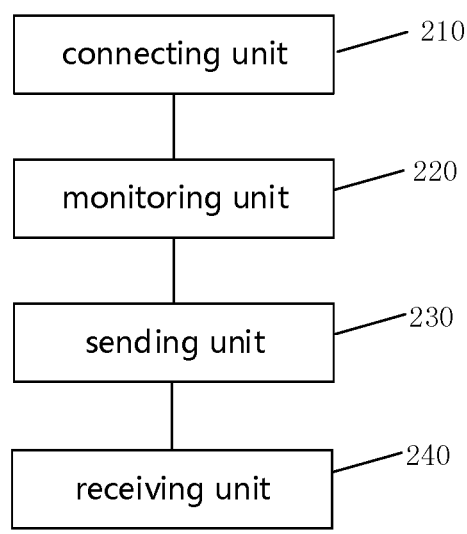
FIG. 6 is a block diagram illustrating a device for reducing terminal temperature according to yet some other embodiments of the present disclosure.

FIG. 6 is a block diagram illustrating a device for reducing terminal temperature according to yet some other embodiments of the present disclosure. Referring to FIG. 6, the device 200 further includes: a receiving component 240. The receiving component 240 is configured to receive a first request sent by the network device in response to the first measurement report.

The connecting component 210 is further configured to switch the connection to the second network based on the first request, wherein a transmission rate between the terminal and the network device when the terminal is connected to the second network is lower than a transmission rate between the terminal and the network device when the terminal is connected to the first network.

In some embodiments, the sending component 230 is further configured to send the first measurement report to the network device again when the first request is not received by the receiving component 240 within a predetermined second time threshold.

In some embodiments, after the connecting component 210 switches the connection to the second network based on the first request, the monitoring component 220 is further configured to monitor the chip temperature, and the sending component 230 sends a second measurement report to the network device when the chip temperature is less than a second predetermined threshold, for reporting to the network device that the quality of the first network is higher than a third threshold and the quality of the second network is lower than a fourth threshold. The receiving component 240 is further configured to receive a second request sent by the network device in response to the second measurement report. The connecting component 210 is further configured to switch the connection to the first network based on the second request.

In some embodiments, the monitoring component 220 monitors the chip temperature, the sending component 230 sends a second measurement report to the network device when the chip temperature is less than a second predetermined threshold by adopting the following manner: sending the second measurement report to the network device when a duration in which the chip temperature is less than the second predetermined threshold exceeds a predetermined third time threshold.

In some embodiments, the sending component 230 is further configured to: send the second measurement report to the network device again when the second request is not received by the receiving component 240 within a predetermined fourth time threshold.

In some embodiments, the rate reduction information includes a rate control signaling, which is used to trigger the network device to reduce a downlink rate with the terminal.

In some embodiments, the monitoring component 220 monitors the chip temperature, the sending component 230 sends a rate restoring signaling to the network device when the chip temperature is less than a third predetermined threshold, and the rate restoring signaling is used to trigger the network device to restore a downlink rate with the terminal.

In some embodiments, the first network is a new radio network, and the second network is a long-term evolution network.

Figure 7:
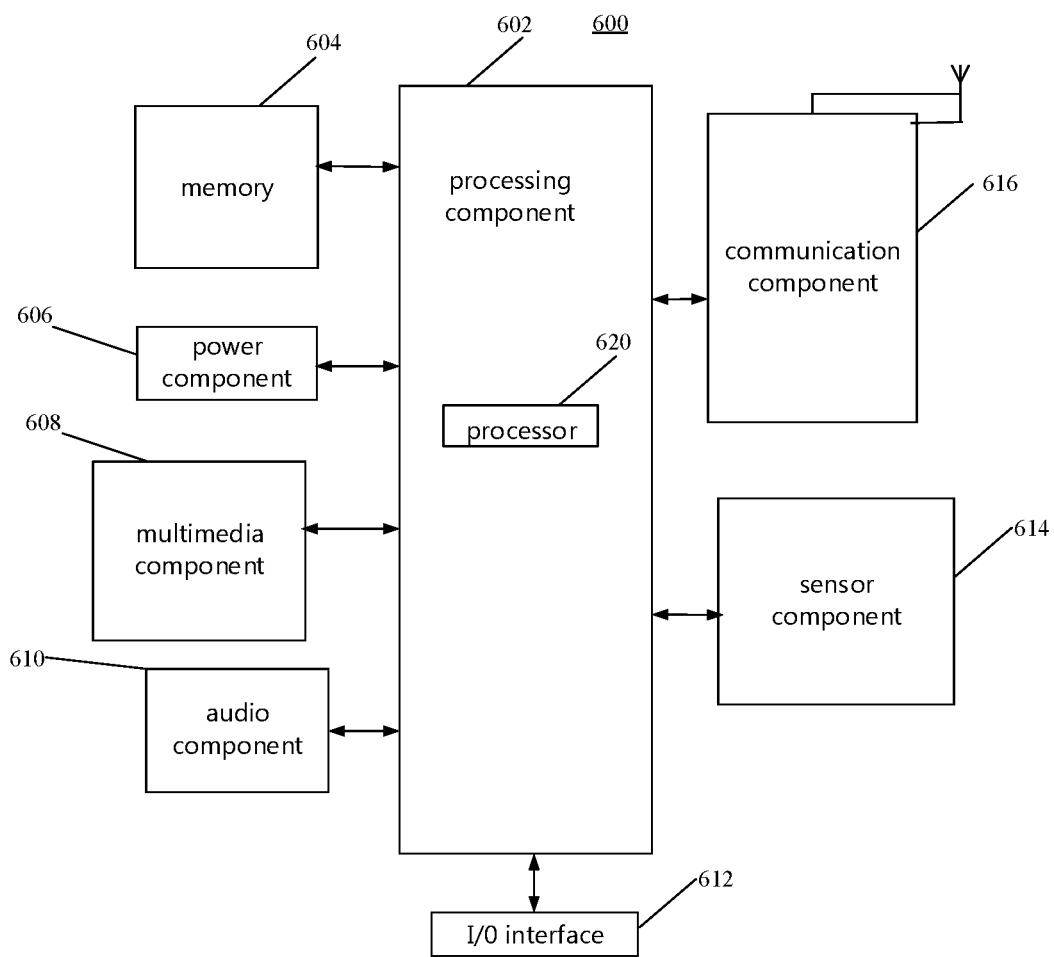
FIG. 7 is a block diagram illustrating a device according to some embodiments of the present disclosure.

FIG. 7 is a block diagram illustrating a device 600 for reducing terminal temperature according to some embodiments of the present disclosure. For example, the device 600 can be a mobile phone, a computer, a digital broadcast terminal, a messaging device, a gaming console, a tablet, a medical device, exercise equipment, a personal digital assistant, and the like.

Referring to FIG. 7, the device 600 can include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 can include one or more processors 620 to execute instructions to perform all or part of the steps in the above described methods. Moreover, the processing component 602 can include one or more modules which facilitate the interaction between the processing component 602 and other components. For instance, the processing component 602 can include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 can include a power management system, one or more power sources, and any other components associated with the generation, management, and distribution of power in the device 600.

The multimedia component 608 includes a screen providing an output interface between the device 600 and the user. In some embodiments, the screen can include a liquid crystal display (LCD) and a touch panel (TP). In some embodiments, organic light-emitting diode (OLED) or other types of displays can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 608 includes a front camera and/or a rear camera. The front camera and the rear camera can receive an external multimedia datum while the device 600 is in an operation mode, such as a photographing mode or a video mode. Each of the front camera and the rear camera can be a fixed optical lens system or have focus and optical zoom capability.

The audio component 610 is configured to output and/or input audio signals. For example, the audio component 610 includes a microphone ("MIC") configured to receive an external audio signal when the device 600 is in an operation mode, such as a call mode, a recording mode, and a voice recognition mode. The received audio signal can be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like.

The buttons can include, but are not limited to, a home button, a volume button, a starting button, and a locking button.

The sensor component 614 includes one or more sensors to provide status assessments of various aspects of the device 600. For instance, the sensor component 614 can detect an open/closed status of the device 600, relative positioning of components, e.g., the display and the keypad, of the device 600, the sensor component 614 can also detect a change in position of the device 600 or a component of the device 600, a presence or absence of user contact with the device 600, an orientation or an acceleration/deceleration of the device 600, and a change in temperature of the device 600. The sensor component 614 can include a proximity sensor configured to detect the presence of nearby objects without any physical contact. The sensor component 614 can also include a light sensor, such as a CMOS or CCD image sensor, for use in imaging applications. In some embodiments, the sensor component 614 can also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as Wi-Fi, 2G, 3G, 4G, 5G or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 600 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 604, executable by the processor 620 in the device 600, for performing the above-described methods. For example, the non-transitory computer-readable storage medium can be a ROM, a RAM, a CD-ROM, a magnetic tape, a floppy disc, an optical data storage device, and the like.

In some embodiments, a non-transitory computer-readable storage medium can be provided. The mobile terminal can be enabled to execute one of the above methods for reducing terminal temperature when instructions in the storage medium are executed by a processor or processing circuit of a mobile terminal.

Various embodiments of the present disclosure can have one or more of the following advantages.

By monitoring the chip temperature of the terminal, rate reduction information is sent to the network device when the chip temperature is greater than the first predetermined threshold, thereby the transmission rate between the network device and the terminal is reduced while network connection is maintained, and accordingly, the terminal temperature is reduced while network connection is maintained, thereby user experience is enhanced.

The various device components, units, blocks, or portions may have modular configurations, or are composed of discrete components, but nonetheless can be referred to as "modules," "components," "units," etc. in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for reducing terminal temperature, applied to a terminal, the method comprising:
   connecting the terminal to a first network; and monitoring a chip temperature of the terminal; and
sending rate reduction information to a network device when the chip temperature is greater than a first predetermined threshold, and the rate reduction information being used to trigger reduction in a transmission rate between the network device and the terminal,
wherein
the rate reduction information comprises a first measurement report for reporting to the network device that quality of the first network is lower than a first threshold and the quality of a second network is higher than a second threshold; and
the method further comprises:
receiving a first request sent by the network device in response to the first measurement report;
switching from the first network to the second network based on the first request, wherein the first network and the second network are networks of different standards, and a transmission rate between the terminal and the network device when the terminal is connected to the second network is lower than a transmission rate between the terminal and the network device when the terminal is connected to the first network;
after said switching from the first network to the second network based on the first request, monitoring the chip temperature, and sending to the network device, when the chip temperature is less than a second predetermined threshold, a second measurement report for reporting to the network device that the quality of the first network is higher than a third threshold and the quality of the second network is lower than a fourth threshold;
receiving a second request sent by the network device in response to the second measurement report; and
switching the connection to the first network based on the second request.

2. The method for reducing terminal temperature according to claim 1, wherein the monitoring a chip temperature of the terminal, and sending rate reduction information to a network device when the chip temperature is greater than a first predetermined threshold further comprises: sending the first measurement report to the network device when a duration in which the chip temperature is greater than the first predetermined threshold exceeds a predetermined first time threshold.

3. The method for reducing terminal temperature according to claim 1, wherein the method further comprises:
sending the first measurement report to the network device again when the first request is not received within a predetermined second time threshold.

4. The method for reducing terminal temperature according to claim 1, wherein the monitoring the chip temperature, and sending a second measurement report to the network device when the chip temperature is less than a second predetermined threshold further comprises: sending the second measurement report to the network device when a duration in which the chip temperature is less than the second predetermined threshold exceeds a predetermined third time threshold.

5. The method for reducing terminal temperature according to claim 1, wherein the method further comprises:
sending the second measurement report to the network device again when the second request is not received within a predetermined fourth time threshold.

6. The method for reducing terminal temperature according to claim 1, wherein the first network is a new radio network, and the second network is a long-term evolution network.

7. The method for reducing terminal temperature according to claim 1, wherein the rate reduction information comprises a rate control signaling which is used to trigger the network device to reduce a downlink rate with the terminal.

8. The method for reducing terminal temperature according to claim 7, wherein the method further comprises:
monitoring the chip temperature, and sending a rate restoring signaling to the network device when the chip temperature is less than a third predetermined threshold, and the rate restoring signaling being used to trigger the network device to restore a downlink rate with the terminal.

9. A non-transitory computer-readable storage medium having stored therein instructions executed by a processor of a mobile terminal to implement a method for reducing terminal temperature according to claim 1.

10. A mobile terminal implementing the method for reducing terminal temperature according to claim 1, wherein the rate reduction information comprises a first measurement report for reporting to the network device that quality of the first network is lower than a first threshold and the quality of a second network is higher than a second threshold, and wherein the terminal is configured to:
send the first measurement report to the network device when a duration in which the chip temperature is greater than the first predetermined threshold exceeds a predetermined first time threshold;
receive a first request sent by the network device in response to the first measurement report; and
switch to the second network based on the first request, wherein a transmission rate between the terminal and the network device when the terminal is connected to the second network is lower than a transmission rate between the terminal and the network device when the terminal is connected to the first network;
wherein the first network is a new radio network, and the second network is a long-term evolution network.

11. A device for reducing terminal temperature, applied to a terminal, the device comprising:
memory storing processor-executable instructions; and
a processor configured to:
connect to a first network;
monitor a chip temperature of the terminal; and
send rate reduction information to a network device when the monitored chip temperature is greater than a first predetermined threshold, and the rate reduction information being used to trigger reduction in a transmission rate between the network device and the terminal,
wherein
the rate reduction information comprises a first measurement report, for reporting to the network device that quality of the first network is lower than a first threshold and quality of a second network is higher than a second threshold; and
the processor is further configured to:
receive a first request sent by the network device in response to the first measurement report;
switch the connection from the first network to the second network based on the first request, wherein the first network and the second network are networks of different standards, and a transmission rate between the terminal and the network device when the terminal is connected to the second network is lower than a transmission rate between the terminal and the network device when the terminal is connected to the first network;

after said switching the connection from the first network to the second network based on the first request, monitor the chip temperature, and send to the network device, when the chip temperature is less than a second predetermined threshold, a second measurement report for reporting to the network device that the quality of the first network is higher than a third threshold and the quality of the second network is lower than a fourth threshold;

receive a second request sent by the network device in response to the second measurement report; and switch the connection to the first network based on the second request.

12. The device for reducing terminal temperature according to claim 11, wherein the processor is further configured to monitor a chip temperature of the terminal, and send rate reduction information to a network device when the chip temperature is greater than a first predetermined threshold by adopting the following manner: sending the first measurement report to the network device when a duration in which the chip temperature is greater than the first predetermined threshold exceeds a predetermined first time threshold.

13. The device for reducing terminal temperature according to claim 11, wherein the processor is further configured to send the first measurement report to the network device again when the first request is not received within a predetermined second time threshold.

14. The device for reducing terminal temperature according to claim 11, wherein the chip temperature is monitored by the processor, and the processor is further configured to send a second measurement report to the network device when the chip temperature is less than a second predetermined threshold by adopting the following manner: sending the second measurement report to the network device when a duration in which the chip temperature is less than the second predetermined threshold exceeds a predetermined third time threshold.

* * * * *